US008743407B2

(12) United States Patent
Shinchi

(10) Patent No.: US 8,743,407 B2
(45) Date of Patent: Jun. 3, 2014

(54) COMPUTER READABLE RECORDING MEDIUM STORED WITH COLOR CONVERSION SETTING PROGRAM, COLOR CONVERSION SETTING METHOD, COMPUTER READABLE RECORDING MEDIUM STORED WITH COLOR CONVERSION PROCESSING PROGRAM, AND COLOR CONVERSION PROCESSING APPARATUS THAT ENABLES CONFIGURATION OF COLOR CONVERSION PROFILES WHEN USING VARIOUS TYPES OF PAPER IN A PRINT JOB

(75) Inventor: Toshimi Shinchi, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 895 days.

(21) Appl. No.: 12/770,699

(22) Filed: Apr. 29, 2010

(65) Prior Publication Data

US 2010/0277753 A1 Nov. 4, 2010

(30) Foreign Application Priority Data

May 1, 2009 (JP) ................. 2009-112042

(51) Int. Cl.
*G06K 15/00* (2006.01)
*G06F 3/12* (2006.01)
*G06F 15/00* (2006.01)

(52) U.S. Cl.
USPC ................. 358/1.16; 358/1.15; 358/1.19

(58) Field of Classification Search
CPC .................................... H04N 1/6097
See application file for complete search history.

(56) References Cited

U.S. PATENT DOCUMENTS

| 6,947,174 | B1 | 9/2005 | Chen et al. |
| 2002/0085235 | A1 | 7/2002 | Degani et al. |
| 2002/0124027 | A1* | 9/2002 | Krueger et al. ............. 707/528 |
| 2005/0270587 | A1* | 12/2005 | Yamakawa et al. .......... 358/448 |

FOREIGN PATENT DOCUMENTS

| EP | 2 043 354 A1 | 4/2009 |
| JP | 2003-237190 | 8/2003 |
| JP | 2007-104492 | 4/2007 |
| JP | 2008-259137 | 10/2008 |

OTHER PUBLICATIONS

Communication Pursuant to Article 94(3) EPC in corresponding European Patent Application No. 10 160 815.6-2202, dated Jul. 26, 2012, 4 pages.

(Continued)

*Primary Examiner* — Vincent Rudolph
*Assistant Examiner* — Peter L Cheng
(74) *Attorney, Agent, or Firm* — Osha Liang LLP

(57) ABSTRACT

A computer readable recording medium stored with a color conversion setting program, the program causes a computer to execute a process comprising: (a) generating a plurality of profile sets respectively associated with paper types, each of the profile sets being to be used for applying at least one kind of color conversion profile having conversion data for converting colors to a color conversion process depending on the particular paper type used for printing; (b) generating color setting information containing the plurality of profile sets respectively associated with paper types to be used during the color conversion process for each job; and (c) executing a control process for registering the color setting information generated in the step (b) to a storage unit, from which the color setting information is read out during the color conversion process.

12 Claims, 13 Drawing Sheets

(56) References Cited

OTHER PUBLICATIONS

Notification of Reason for Refusal, Japanese Patent Application No. 2009-112042, dated May 17, 2011.

European Search Report dated Jul. 12, 2010.
Notification of The First Office Action mailed on Nov. 2, 2011 from the State Intellectual Property Office of People's Republic of China in a corresponding Chinese patent application No. 201010171062.0 (5 pages).

* cited by examiner

FIG.15

```
...
@PJL SET color configuration ="JAPANCOLOR"
@PJL SET setting for each page 1="PRINT,LEFT,ON,AUTO,NOSET,NOSET,NOSET,OFF,NOSET,OFF,OFF,CONT,1"
@PJL SET paper attribute setting 1="Coated"
@PJL SET setting for each page 2="PRINT,LEFT,ON,AUTO,NOSET,NOSET,NOSET,OFF,NOSET,OFF,OFF,CONT,2-10"
@PJL SET paper attribute setting 2="Plain"
...
```

COMPUTER READABLE RECORDING MEDIUM STORED WITH COLOR CONVERSION SETTING PROGRAM, COLOR CONVERSION SETTING METHOD, COMPUTER READABLE RECORDING MEDIUM STORED WITH COLOR CONVERSION PROCESSING PROGRAM, AND COLOR CONVERSION PROCESSING APPARATUS THAT ENABLES CONFIGURATION OF COLOR CONVERSION PROFILES WHEN USING VARIOUS TYPES OF PAPER IN A PRINT JOB

CROSS-REFERENCE TO RELATED APPLICATION

This application is based on Japanese Patent Application No. 2009-112042, filed on May 1, 2009, the contents of which are incorporated herein by reference.

BACKGROUND

1. Technical Field

The present invention relates to a computer readable recording medium stored with a color conversion setting program, a color conversion setting method, a computer readable recording medium stored with a color conversion processing program, and a color conversion processing apparatus. The present invention especially relates to a computer readable recording medium stored with a color conversion setting program, a color conversion setting method, a computer readable recording medium stored with a color conversion processing program, and a color conversion processing apparatus for executing a color conversion process using a color conversion profile.

2. Description of Related Art

In transmitting color images between digital processing devices such as a personal computer, a printer, and a digital camera, it is necessary to adjust colors of image data considering characteristics of the color space which is specific to each device. A color conversion profile containing a color conversion table is used for adjusting the colors of the image data.

As a technology related to it, an image processing apparatus has been proposed for the purpose of simplifying hue adjustments in outputting image data in the Unexamined Japanese Patent Publication No. 2008-259137. The image processing apparatus disclosed in the Unexamined Japanese Patent Publication No. 2008-259137 has a color setting adjustment means for adjusting color setting information of image data to be output and a color setting storage means for storing the adjusted color setting information in a color profile. With such a constitution, the hue adjustment executed by the user is stored in the color profile as color setting information so that there will be no need to repeat a similar hue adjustment when printing other image data from the application.

However, the color conversion profile is set up for each type of paper on which images are printed. Therefore, it is necessary for the user to set up a color conversion profile for each paper type in case of executing a printing process using various types of paper.

SUMMARY

The present invention is intended to solve the above-mentioned problem. The object of the present invention is to provide a computer readable recording medium stored with a color conversion setting program, a color conversion setting method, a computer readable recording medium stored with a color conversion processing program, and a color conversion processing apparatus that enable the user to set up desired color conversion profiles easily even when executing a printing process using various types of paper.

To achieve at least one of the above-mentioned objects, the computer readable recording medium stored with the color conversion setting program reflecting one aspect of the present invention, the program causes a computer to execute a process comprising: (a) generating a plurality of profile sets respectively associated with paper types, each of the profile sets being to be used for applying at least one kind of color conversion profile having conversion data for converting colors to a color conversion process depending on the particular paper type used for printing; (b) generating color setting information containing the plurality of profile sets respectively associated with paper types to be used during the color conversion process for each job; and (c) executing a control process for registering the color setting information generated in the step (b) to a storage unit, from which the color setting information is read out during the color conversion process.

It is preferable in the above-mentioned computer readable recording medium that a plurality of profile sets are generated for identical paper type in the step (a), and the process further comprises, prior to the step (b): (d) accepting a plurality of user's selected profile sets to be contained in the color setting information from the plurality of profile sets generated in the step (a), and the color setting information containing the plurality of profile sets accepted in the step (d) is generated in the step (b).

It is preferable in the above-mentioned computer readable recording medium that the step (d) includes: (d1) extracting profile sets having common color conversion characteristics from the plurality of profile sets generated in the step (a); and (d2) accepting user's selected profile sets to be contained in the color setting information from the profile sets extracted in the step (d1).

It is preferable in the above-mentioned computer readable recording medium that the profile set contains an RGB profile, which is a color conversion profile to be applied to a color conversion process of RGB type image data, a CMYK profile, which is a color conversion profile to be applied to a color conversion process of CMYK type image data, and a destination profile, which is a color conversion profile to be applied to a color conversion process of image data after the color conversion process where the RGB profile or CMKY profile is applied, and the profile sets containing the identical RGB and CMYK profiles are extracted from the plurality of profile sets in the step (d1).

It is preferable in the above-mentioned computer readable recording medium that the profile set contains a device link profile, which is a color conversion profile to be applied to a direct color conversion process between devices, the device link profile having color calibration function for calibrating colors, and the profile sets containing the device link profile having the identical color calibration function are extracted from the plurality of profile sets in the step (d1).

It is preferable in the above-mentioned computer readable recording medium that each of the device link profiles contains a plurality of per-object device link profiles generated for each type of objects that constitute the image data, and the profile sets where each of the per-object device link profiles has the identical color calibration function are extracted in the step (d1).

To achieve at least one of the above-mentioned objects, the computer readable recording medium stored with the color conversion processing program reflecting one aspect of the present invention, the program causes a computer to execute a process comprising: (a) registering to a storage unit plural sets of color setting information each of which contains a plurality of profile sets, each of the profile sets being respectively associated with paper type and being to be used during the color conversion process for each job; (b) receiving a print job containing specific information which shows a color setting information specified by the user among the plural sets of color setting information registered in the storage unit; (c) reading out the color setting information specified by the specific information contained in the print job received in the step (b), from the storage unit; and (d) executing a color conversion process on image data of an image which will be printed on the type of paper which the profile set is associated with, using the color conversion profile of the profile set contained in the color setting information read out in the step (c).

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 15 is a diagram showing an example of print data.

DETAILED DESCRIPTION

The embodiment of this invention will be described below with reference to the accompanying drawings.

Figure 1:
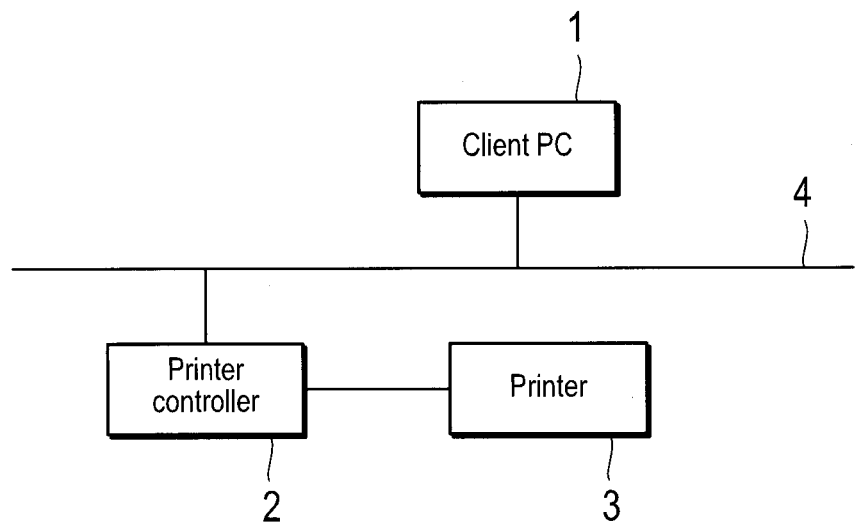
FIG. 1 is a block diagram showing the overall constitution of a printing system according to an embodiment of the present invention.

FIG. 1 is a block diagram showing the overall constitution of a printing system according to an embodiment of the present invention. As shown in FIG. 1, the printing system according to the present embodiment has a client PC 1, a printer controller 2, and a printer 3.

The client PC 1 and the printer controller 2 are communicably connected with each other via a network 4. The network 4 can be a LAN connecting computers and network equipment according to standards such as Ethernet, Token Ring, and FDDI, or a WAN that consists of several LANs connected by a dedicated line. The printer controller 2 and the printer 3 are connected with each other via a dedicated interface bus such as IEEE 1394 serial bus, USB (Universal Serial Bus), etc. However, the printer controller 2 and the printer 3 can be connected via the network 4 as well. The types and the number of equipment to be connected to the network 4 are not limited to those shown in FIG. 1.

Figure 2:
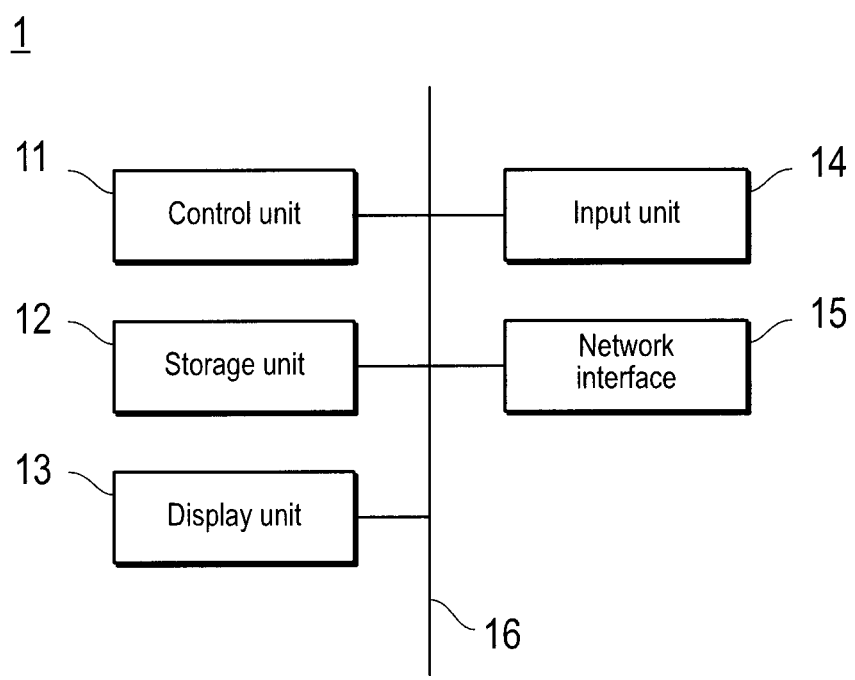
FIG. 2 is a block diagram showing the constitution of the client PC shown in FIG. 1.

FIG. 2 is a block diagram showing the constitution of the client PC shown in FIG. 1.

The client PC 1 has a control unit 11, a storage unit 12, a display unit 13, an input unit 14, and a network interface 15, all of which are interconnected via a bus 16 for exchanging signals.

The control unit 11 is a CPU, and controls various units indicated above and executes various arithmetic processes according to a program. The storage unit 12 consists of a ROM for storing various programs and data, a RAM for temporarily storing programs and data as a working area, a hard disk for storing various programs including an operating system and data, etc.

The display unit 13 is typically a liquid crystal display and displays various kinds of information. The input unit 14 includes a pointing device such as a mouse, a keyboard, and others, and is used for executing various kinds of inputs.

The network interface 15 is an interface for communicating with external equipment, and network interfaces such as Ethernet, Token Ring, and FDDI standards, serial interfaces such as USB and IEEE 1394, parallel interfaces such as SCSI and IEEE 1284, wireless communication interfaces such as Bluetooth (registered trademark), IEEE 802.11, HomeRF, and IrDA, as well as telephone circuit interfaces for connection to telephone circuits can be used.

Figure 3:
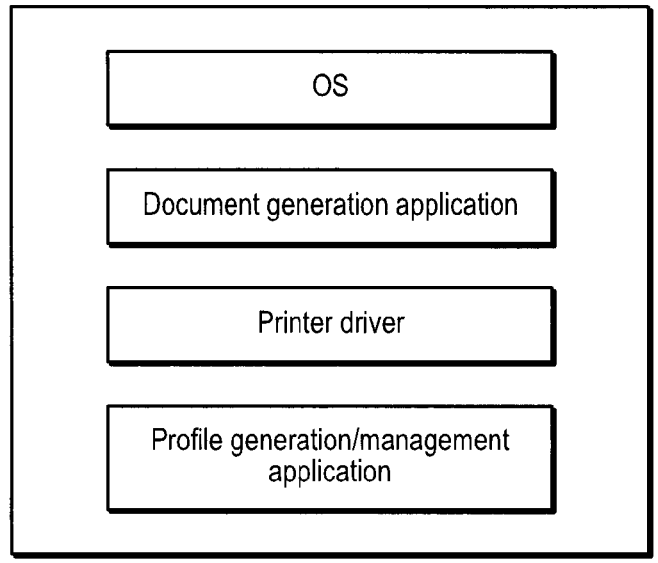
FIG. 3 is a diagram for describing the contents of the storage unit of the client PC shown in FIG. 2.

FIG. 3 is a diagram for describing the contents of the storage unit of the client PC shown in FIG. 2. As shown in FIG. 3, the operating system, a document generation application for generating document files, a printer driver for converting the document files into print data described in a page description language (PDL) that can be understood by the printer controller 2, and a profile generation/management application for generating color conversion profiles, profile sets, and color configurations are installed on the storage unit 12 of the client PC 1. In the present specification, a PDF (Portable Document Format) document file is treated as a print data described in PDL.

Figure 4:
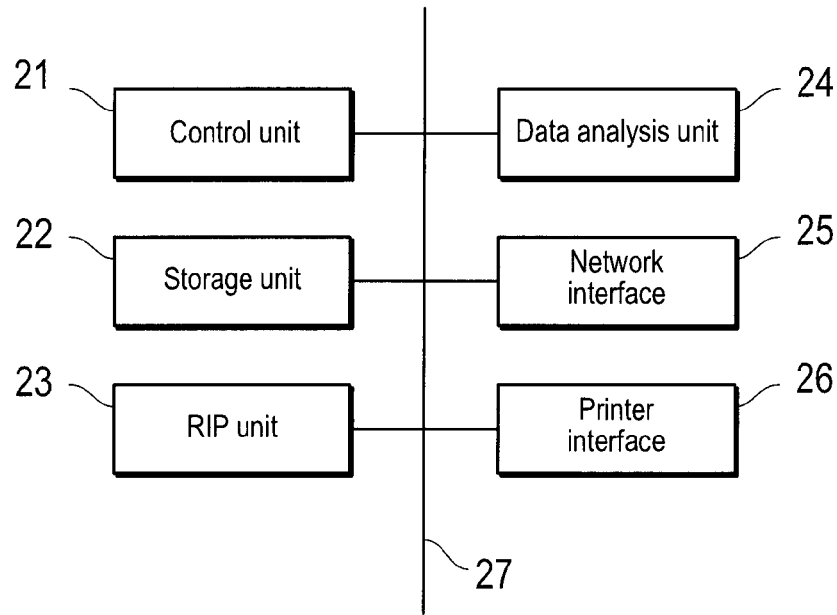
FIG. 4 is a block diagram showing the constitution of the printer controller shown in FIG. 1.

FIG. 4 is a block diagram showing the constitution of the printer controller shown in FIG. 1.

The printer controller 2 has a control unit 21, a storage unit 22, a RIP unit 23, a data analysis unit 24, a network interface 25, and a printer interface 26, all of which are interconnected via a bus 27 for exchanging signals. The descriptions of those units of the printer controller 2 that have the same functions as those of the corresponding units of the client PC 1 will be omitted here to avoid being duplicative.

The RIP unit 23 executes a rasterizing process of developing the print data received from the client PC 1 to image data of the bitmap format. The data analysis unit 24 analyzes the print data processing method. The printer interface 26 is an interface for communicating with the locally connected printer 3.

Figure 5:
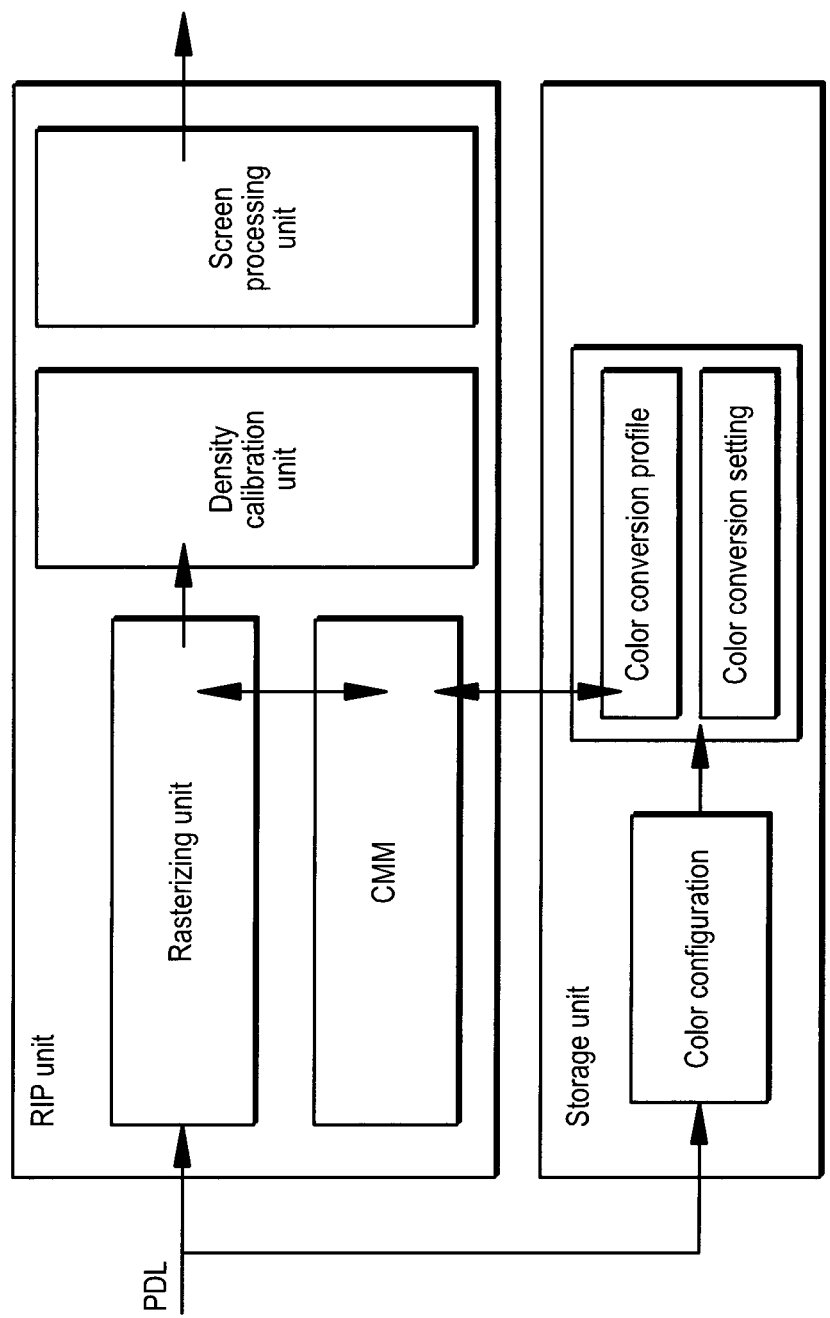
FIG. 5 is a block diagram conceptually showing the operation of the RIP unit of the printer controller shown in FIG. 4.

FIG. 5 is a block diagram conceptually showing the operation of the RIP unit of the printer controller shown in FIG. 4. As shown in FIG. 5, the RIP unit 23 has a rasterizing unit, CMM (Color Management Module), a density calibration unit, and a screen processing unit. The print data (PDL data) contained in the print job received from the client PC 1 is rasterized at the rasterizing unit to be converted to image data of the bitmap format. The color conversion process is executed on the image data generated in the rasterizing unit by CMM using the color conversion profile specified in the print job. The density calibration process and the screen process are executed on the color converted image data in sequence, and the resultant image data is sent to the printer 3.

Figure 6:
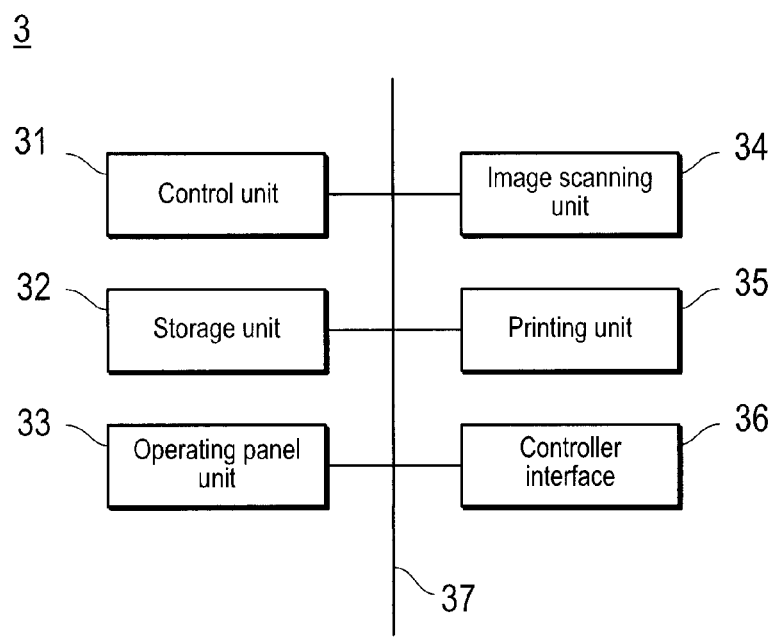
FIG. 6 is a block diagram showing the constitution of the printer shown in FIG. 1.

FIG. 6 is a block diagram showing the constitution of the printer shown in FIG. 1.

The printer 3 has a control unit 31, a storage unit 32, an operating panel unit 33, an image scanning unit 34, a printing unit 35, and a controller interface 36, all of which are interconnected with each other via a bus 37 for exchanging signals. The descriptions of those units of the printer 3 that have the same functions as those of the corresponding units of the client PC 1 will be omitted here to avoid being duplicative.

The storage unit 32 stores a printing process program to be executed based on the image data of the bitmap format received from the printer controller 2. The operating panel unit 33 is equipped with a touch panel, a ten-key pad, a start button, a stop button and others to be used for displaying various data and entering various instructions.

The image scanning unit 34 irradiates a document set on the specified scanning position on a document table or transported to the specified scanning position by the ADF (Auto Document Feeder) with light from a light source such as a fluorescent lamp, and generates digital data of the document image by scanning the reflected light by means of a light sensitive device such as a CCD image sensor, a CMOS image sensor and the like.

The printing unit 35 prints images based on image data received from the printer controller 2 on recording media such as paper using a known image forming process such as an electronic photography type process. The controller interface 36 is an interface for communicating with the locally connected printer controller 2.

Figure 7:
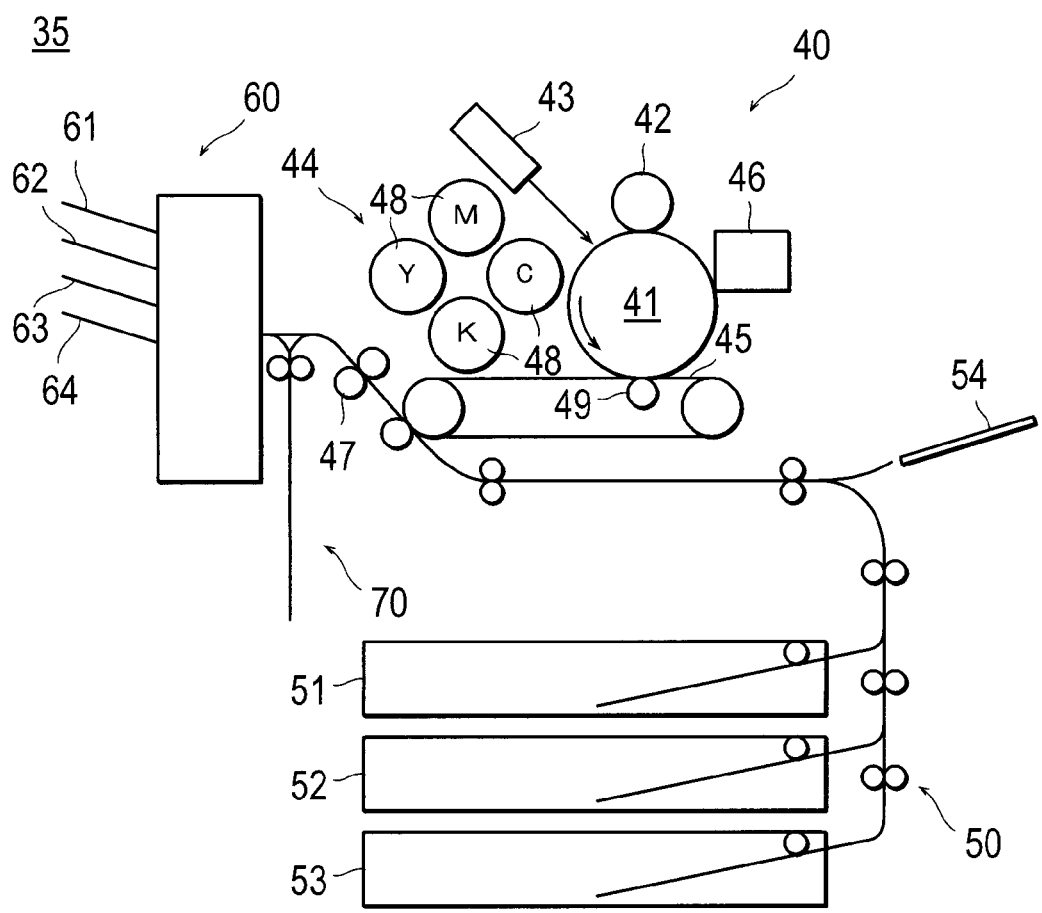
FIG. 7 is a diagram schematically showing the constitution of the printing unit of the printer shown in FIG. 6.

FIG. 7 is a diagram schematically showing the constitution of the printing unit of the printer shown in FIG. 6.

The printing unit 35 has a paper supply unit 50 for supplying recording media such as paper, an image forming unit 40 for forming images on the recording media, and a paper discharge unit 60 for discharging paper. The printing unit 35 also has a reversing mechanism unit 70 for reversing the front and back sides of paper.

The image forming unit 40 of the printing unit 35 has a photoconductor drum 41 that rotates in the arrow direction, a charging device 42, an exposing device 43, a developing device 44, an intermediate transfer belt 45, a cleaning device 46, and a fixing device 47. After the surface of the photoconductor drum 41 is evenly charged by means of the charging device 42, an electrostatic latent image is formed on the surface of the photoconductor drum 41 as it is irradiated with laser beams by the exposing device 43. The electrostatic latent image visualizes as the toner adheres to the electrostatic latent image on the photoconductor drum 41 in accordance with a turn of the photoconductor drum 41. The developing device 44 has developing rollers 48 for each of the colors, cyan (C), magenta (M), yellow (Y), and black (K), and visualized toner images of these colors are transported to the transfer unit 49, then onto the intermediate transfer belt 45, and overlaid on top of each other there, so that the overlaid color image can be transferred to the paper supplied from the paper supply unit 50. The toner images are then fixed on the paper by the fixing device 47 and transported to the paper discharge unit 60.

The paper supply unit 50 has a plurality of paper supply trays 51-54. The paper supply trays 51-53 store different types of paper. The paper supply trays 51-53 may store, for example, coated paper, plain paper, and recycled paper respectively. The paper supply tray 54 is a manual feed sheet supply tray. The paper discharge unit 60 has a plurality of paper discharge trays 61-64. The paper discharge unit 60 may have a post-processing part for providing post-processes such as punching or stapling to the paper transported there.

The client PC 1, the printer controller 2, and the printer 3 may each contain constitutional elements other than those described above, or may lack a portion of the above-mentioned elements.

In the printing system of the present embodiment constituted as described above, a color configuration which is the color setting information for each print job is used in order to execute a proper color conversion process for each paper in the printing process using various types of paper. The outline of the operation of the printing system of the present embodiment will be described below with reference to the FIG. 8 through FIG. 15.

First, the outline of the operation of the client PC 1 of the present embodiment will be described below with reference to the FIG. 8 through FIG. 10.

Figure 8:
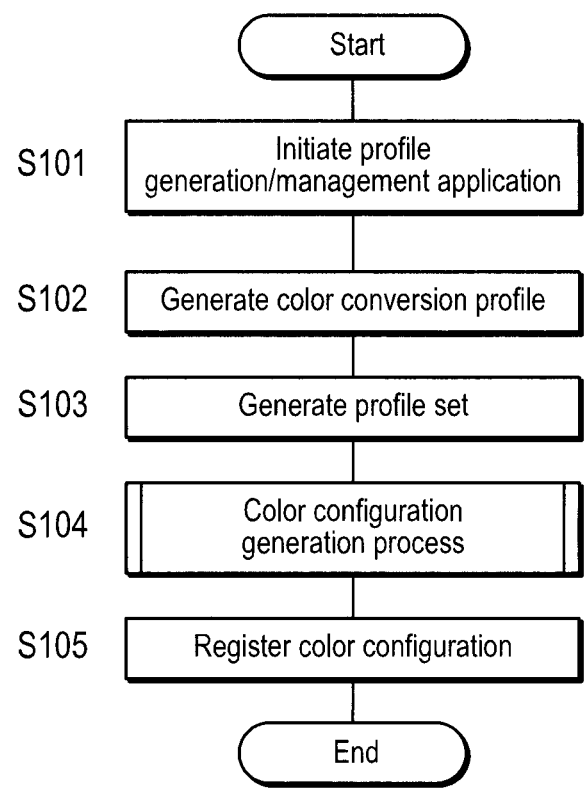
FIG. 8 is a flowchart for describing the setting process executed by the client PC shown in FIG. 1.

FIG. 8 is a flowchart for describing the setting process executed by the client PC 1 shown in FIG. 1. The algorithm shown in the flowchart of FIG. 8 is stored as a program in the storage unit 12 of the client PC 1 and executed by the control unit 11.

As shown in FIG. 8, in the setting process of the present embodiment, the profile generation/management application is initiated first (step S101). In the present embodiment, the GUI screen is displayed on the display unit as the profile generation/management application is initiated by the user's operation.

Next, the color conversion profiles are generated (step S102). In the present embodiment, RGB source profile, CMYK target profile, CMYK destination profile, RGB-CMYK device link profiles, and CMYK-CMYK device link profiles are generated by the user's operation. The RGB source profile is a color conversion profile to be used for the color conversion process of RGB type image data, and the CMYK target profile is a color conversion profile to be used for the color conversion process of CMYK type image data. The CMYK destination profile is a color conversion profile to be used for the color conversion process of image data that has been processed using either the RGB source profile or the CMKY target profile. The RGB-CMYK device link profile is a color conversion profile to be used for the color conversion process of RGB type image data and enables a direct color conversion process between an input device and an output device. The CMYK-CMYK device link profile is a color conversion profile to be used for the color conversion process of CMYK type image data and enables a direct color conversion process between an input device and an output device. The RGB-CMYK device link profile and the CMYK-CMYK device link profile are generated for each of the text objects (Text), graphic objects (Graphic), and photographic objects (Image) individually. Since the nine kinds of color conversion profiles mentioned above are all commonly-used color conversion profiles having color conversion table, detailed descriptions are omitted here. The color conversion profile does not have to be generated on each occasion by the user's operation, but rather can be selected from a list of generated color conversion profiles by the user's operation.

Next, the profile set is generated (step S103). In the present embodiment, the nine kinds of color conversion profiles generated in the process shown in step S102 are associated with paper type (e.g., coated paper) specified by the user's operation to generate a profile set. The generated profile set is stored in the storage unit 12. A plurality of profile sets are generated as step S102 and step S103 are repeated a plurality of times.

Figure 9:
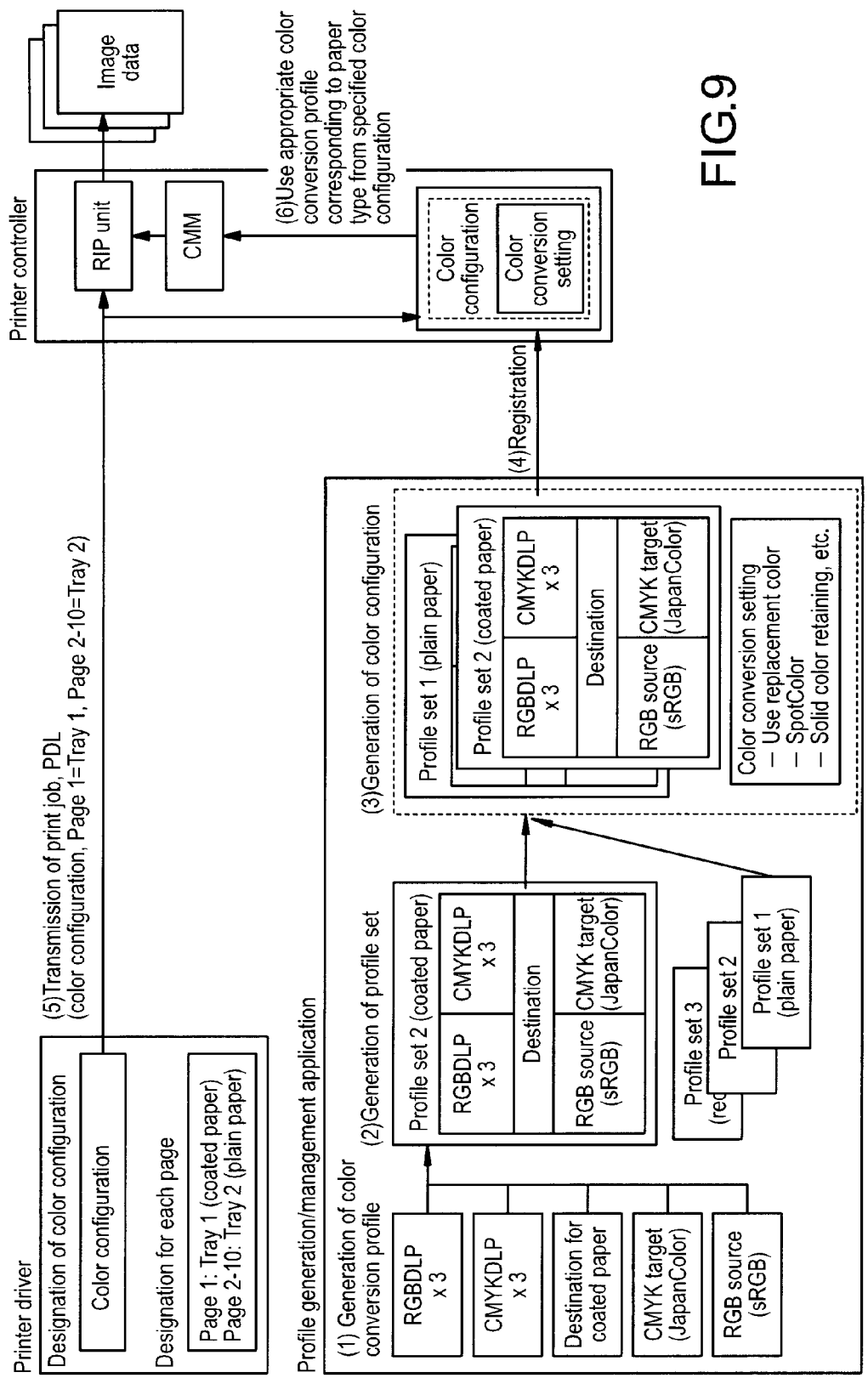
FIG. 9 is a diagram for describing the operation of the printing system shown in FIG. 1.

FIG. 9 is a diagram for describing the operation of the printing system shown in FIG. 1. As shown in FIG. 9, nine kinds of color conversion profiles are first generated in the setting process of the present embodiment. Nine kinds of color conversion profiles are brought together to generate a profile set which is associated with paper type (e.g., coated sheet). In FIG. 9, a profile set 1 associated with plain paper, a profile set 2 associated with coated paper, and a profile set 3 associated with recycled paper are generated.

A plurality of profile sets can be generated for the identical paper type. For example, a profile set 1a and a profile set 1b can be generated as a profile set 1 associated with coated paper. The profile set 1a and the profile set 1b contain color conversion profiles having different color conversion tables. For example, the profile set 1a and the profile set 1b have an RGB source profile named "sRGB" and an RGB source profile named "AdobeRGB" respectively, while the RGB source profile named "sRGB" and the RGB source profile named "AdobeRGB" have color conversion tables different to each other.

In the present specification, same paper type but with different weights are treated as different paper type, for example, different profile sets can be generated for two plain paper with different weights (heavy paper and thin paper).

Next, the color configuration is generated (step S104). In the present embodiment, at least one profile set is selected by the user's operation from a plurality of profile sets generated in the process shown in step S103 to generate a color configuration. For example, in FIG. 9, a color configuration containing two profile sets, a profile set 1 associated with plain paper and a profile set 2 associated with coated paper, is generated. A color configuration can contain a color conversion setting for each print job. The details of the color configuration generation process shown in step S104 will be described later.

Next, the color configuration is registered (step S105). In the present embodiment, the color configuration generated in the process shown in step S104 is registered in the storage unit 22 of the printer controller 2. At this point, a name (e.g., JAPANCOLOR) is given to the color configuration.

As described in the above, according to the process of the flowchart shown in FIG. 8, a plurality of profile sets, each of which is associated with paper type, are generated and the plurality of profile sets are brought together to generate a color configuration. The color configuration thus generated is registered in the storage unit 22 of the printer controller 2. As the above-mentioned processes are repeated a plurality of times, a plurality of color configurations are generated and the color configurations are registered in the storage unit 22 of the printer controller 2.

Next, a printing process using a color configuration will be described with reference to FIG. 10.

Figure 10:
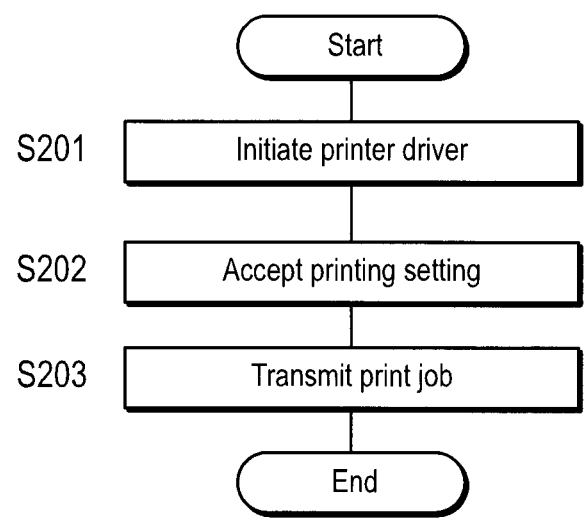
FIG. 10 is a flowchart for describing the printing process executed by the client PC shown in FIG. 1.

FIG. 10 is a flowchart for describing the printing process executed by the client PC shown in FIG. 1. The algorithm shown in the flowchart of FIG. 10 is stored as a program in the storage unit 12 of the client PC 1 and executed by the control unit 11.

As shown in FIG. 10, in the printing process of the present embodiment, the printer driver is initiated first (step S201). For example, the printer driver is initiated in correspondence with the printing instruction by the user's operation in the document generation application, and the printing setting screen is displayed on the display unit 13.

Next, the printing setting is accepted (step S202). In the present embodiment, the name of the color configuration to be used for the color conversion process and paper type specified for each page of the print document are accepted. For example, a particular color configuration is specified by the selection of a color configuration by the user's operation from a list of color configurations registered in the memory unit 22 of the printer controller 2, which is displayed on the printing setting screen. In FIG. 9, in addition to specifying the particular color configuration, "coated paper" is specified as the type of paper on which the image of the first page is printed and "plain paper" is specified as the type of paper on which the images of the second page and thereafter are printed.

Next, the print job is transmitted (step S203). In the present embodiment, a print job containing color configuration setting information, setting information for each page, and setting information for paper type is transmitted to the printer controller 2. Upon receiving a print job, the printer controller 2 reads out a color configuration specified by the above-mentioned color configuration setting information, and a proper color conversion process is executed for each page using the color conversion profiles contained in the color configuration. For example, as to the image data of the first page, a color conversion process is executed using the color conversion profile contained in the profile set 1 which is associated with coated paper. Also, as to the image data of the second page and thereafter, a color conversion process is executed using the color conversion profile contained in the profile set 2 which is associated with plain paper.

As described in the above, according to the process of the flowchart shown in FIG. 10, the color configuration and paper type for each page are specified by the user, and the printing process is executed. With such a constitution, the user can easily set up desired color conversion profiles by simply specifying a color configuration among a plurality of color configurations registered in the printer controller 2 without having to specify a color conversion profile for each paper type even when executing a printing process using various types of paper.

Next, the color configuration generation process shown in step S104 of FIG. 8 will be described in detail with reference to FIG. 11.

Figure 11:
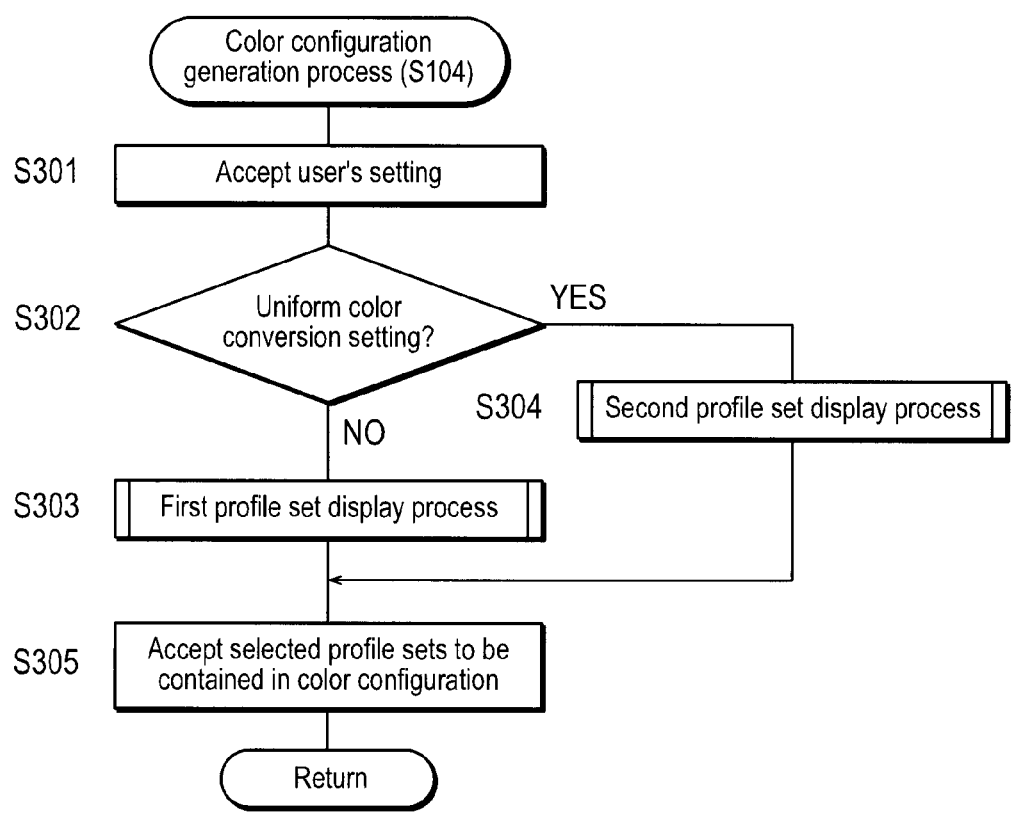
FIG. 11 is a flowchart for describing the color configuration generation process shown in step S104 of FIG. 8.

FIG. 11 is a flowchart for describing the color configuration generation process shown in step S104 of FIG. 8. As shown in FIG. 11, in the color configuration generation process of the present embodiment, user's setting for generating the color configuration is accepted first (step S301). In the present embodiment, setting by the user for the standard in selecting a plurality of profile sets to be contained in the color configuration, is accepted.

Next, a judgment is made as to whether or not color conversion setting of the profile sets should be uniformed (step S302). In the present embodiment, a judgment is made as to whether or not the setting concerning color calibration functions (the solid color retaining function and the color contamination removal function) for the CMYK-CMYK device link profile contained in each of the profile sets should be uniformed, according to the user's setting accepted in the process shown in step S301.

If it is judged that color conversion setting of the profile sets should not be uniformed (step S302: No), the first profile set display process that displays a list of profile sets containing the identical RGB source profile and CMYK target profile is executed (step S303). The detailed description of the first profile set display process shown in step S303 will be described later.

On the other hand, if it is judged that color conversion setting of the profile sets should be uniformed (step S302: Yes), the second profile set display process that displays a list of profile sets containing the CMYK-CMYK device link profile where the identical color conversion setting is set up, is executed (step S304). The detailed description of the second profile set display process shown in step S304 will be described later.

Next, profile sets selected by the user's operation from a list of profile sets are accepted (step S305). In the present embodiment, profile sets selected by the user to be contained in the color configuration from a list of profile sets displayed by the process shown in step S303 or S304, are accepted. As a result, a color configuration containing desired profile sets, each of which is associated with paper type, is generated. At this point, the color conversion setting for each print job such as the use of a replacement color, a spot color etc. can be set up.

As described in the above, according to the process of the flowchart shown in FIG. 11, a list of profile sets is first displayed on the GUI screen according to the user's setting. As the user selects a desired profile sets from a list of profile sets displayed on the GUI screen, a color configuration is generated.

Figure 12:
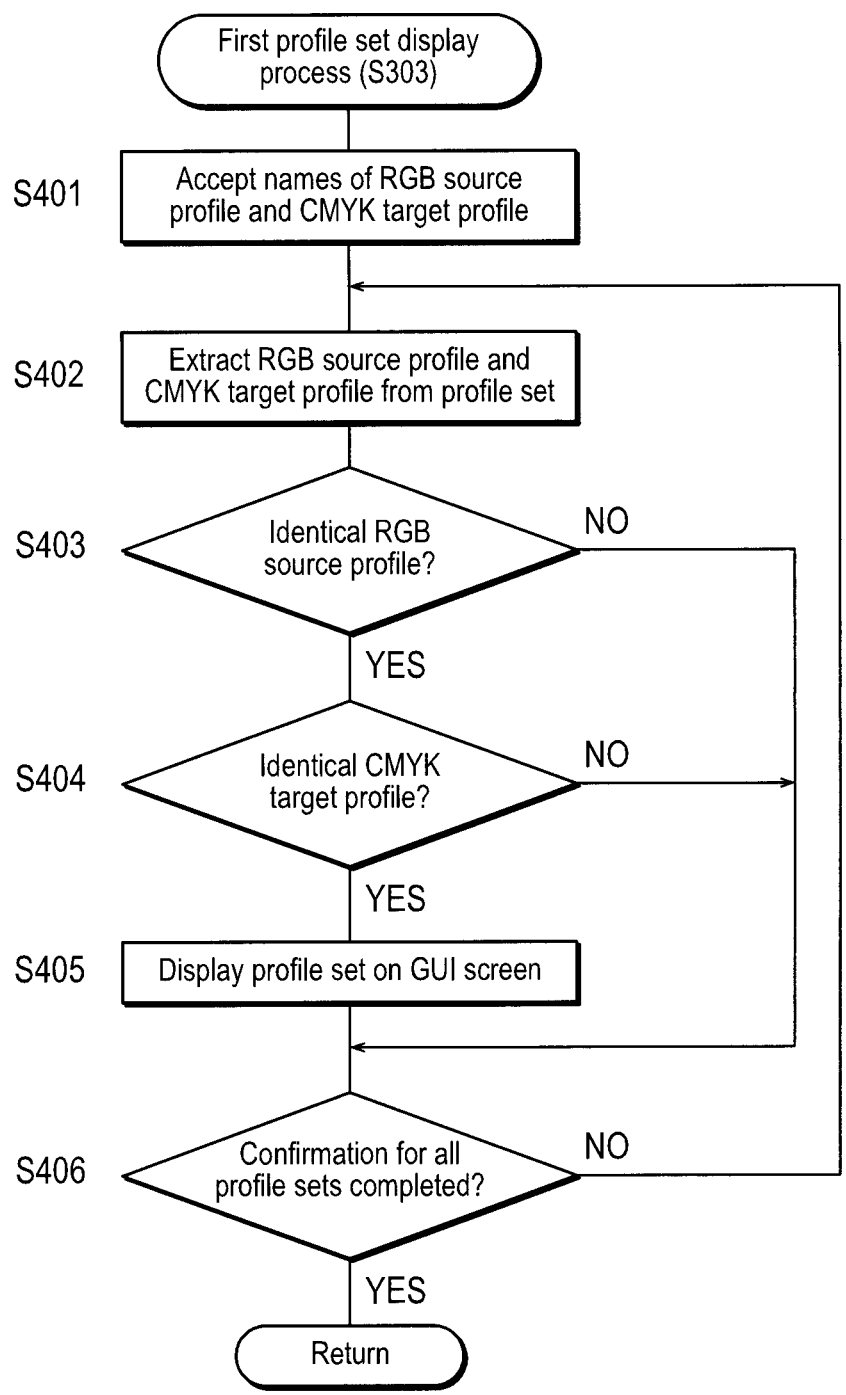
FIG. 12 is a flowchart for describing the first profile set display process shown in step S303 of FIG. 11.

FIG. 12 is a flowchart for describing the first profile set display process shown in step S303 of FIG. 11.

As shown in FIG. 12, in the first profile set display process of the present embodiment, the names of the RGB source profile and the CMYK target profile are accepted first (step S401). In the present embodiment, the names of the RGB source profile and the CMYK target profile entered by the user's operation are accepted. For example, "sRGB" is accepted as the name of the source profile, and "JapanColor" is accepted as the name of the CMYK target profile.

Next, a profile set is selected from a plurality of profile sets, and the RGB source profile and the CMYK target profile are extracted from the selected profile set (step S402). In the present embodiment, a profile set is selected from the profile sets that are generated in the process of the flowchart shown in FIG. 8, and the RGB source profile and the CMYK target profile contained in the selected profile set are extracted.

Next, a judgment is made as to whether or not the extracted RGB source profile is identical to the specified RGB source profile (step S403). In the present embodiment, for example, a judgment is made as to whether or not the name of the RGB source profile extracted in the process shown in step S402 is identical to "sRGB" which is the name of the RGB source profile accepted in the process shown in step S401. Furthermore, RGB source profiles of an identical name contain an identical color conversion table.

If it is judged that the extracted RGB source profile is not identical to the specified RGB source profile (step S403: No), the program moves on to the processes of step S406 and thereafter. On the other hand, if it is judged that the extracted RGB source profile is identical to the specified RGB source profile (step S403: Yes), a judgment is made as to whether or not the extracted CMYK target profile is identical to the specified CMYK target profile (step S404). In the present embodiment, for example, a judgment is made as to whether or not the name of the CMYK target profile extracted in the process shown in step S402 is identical to "JAPANCOLOR" which is the name of the CMYK target profile accepted in the process shown in step S401. Furthermore, CMYK target profiles of an identical name contain an identical color conversion table.

If it is judged that the extracted CMYK target profile is not identical to the specified CMYK target profile (step S404: No), the program moves on to the processes of step S406 and thereafter. On the other hand, if it is judged that the extracted CMYK target profile is identical to the specified CMYK target profile (step S404: Yes), the profile set is displayed on the GUI screen (step S405). In the present embodiment, a profile set selected in the process shown in step S402 is displayed on the GUI screen as a candidate of the profile set to be contained in the color configuration.

Next, a judgment is made as to whether or not confirmations are completed for all the profile sets (step S406). If it is judged that confirmations for all the profile sets are not yet completed (step S406: No), the processes of step S402 and thereafter are repeated until confirmations for all the profile sets are completed. On the other hand, if it is judged that confirmations for all the profile sets are completed (step S406: Yes), the process is terminated.

As described in the above, according to the process of the flowchart shown in FIG. 12, profile sets each of which contains the RGB source profile and the CMYK target profile specified by the user are extracted from a plurality of profile sets, and a list of the profile sets is displayed on the GUI screen. Consequently, by selecting a desired profile sets from the list of the profile sets, the user can easily generate a color configuration consisting of profile sets containing the identical RGB source profile and CMYK target profile.

Next, the second profile set display process shown in step S304 of FIG. 11 will be described below with reference to FIG. 13.

Figure 13:
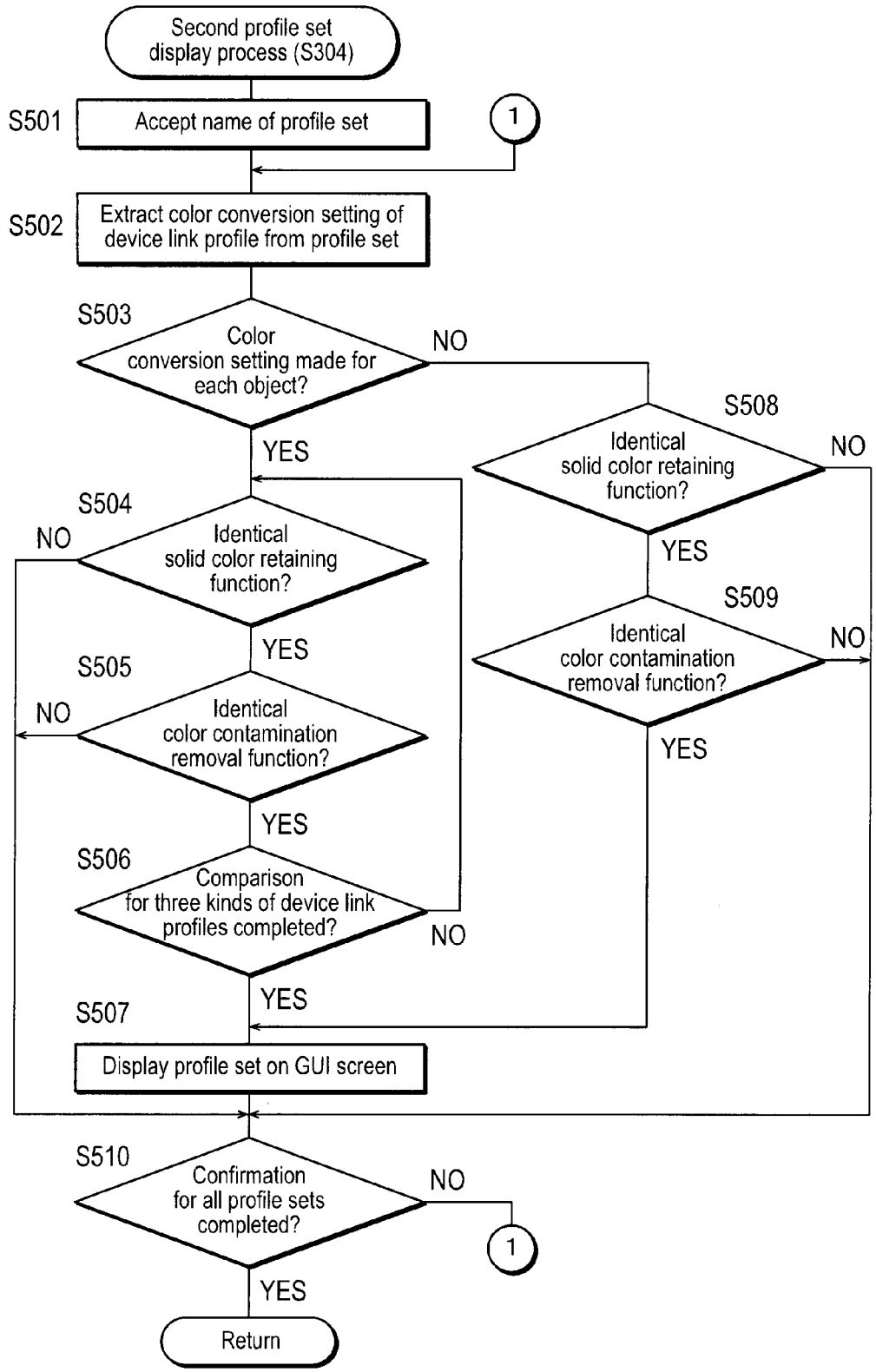
FIG. 13 is a flowchart for describing the second profile set display process shown in step S5304 of FIG. 11.

FIG. 13 is a flowchart for describing the second profile set display process shown in step S304 of FIG. 11. As shown in FIG. 13, in the second profile set display process of the present embodiment, the name of a profile set is accepted first (step S501). In the present embodiment, the name of a profile set entered by the user's operation via the GUI screen is accepted.

Next, a profile set is selected from a plurality of profile sets and the color conversion setting of the device link profile of the selected profile set is extracted (step S502). In the present embodiment, a profile set is selected from a plurality of profile sets that are generated in the process of the flowchart shown in FIG. 8, and the settings (ON/OFF) for the solid color retaining function and the color contamination removal function of the CMYK-CMYK device link profile contained in the profile set are extracted.

Next, a judgment is made as to whether or not the color conversion settings of the device link profiles contained in the profile set specified by the user are set up for each object (step S503). In the present embodiment, a judgment is made as to whether or not the settings (ON/OFF) for the solid color retaining function and the color contamination removal function of the three kinds of device link profiles contained in the profile set whose name is accepted in the process shown in step S501 are identical with each other. In particular, a judgment is made as to whether or not the color conversion settings of the three kinds of device link profile are set up for each object by judging the settings (ON/OFF) concerning a uniform of color conversion setting of the three kinds of device link profiles.

If it is judged that the color conversion settings of the device link profiles are set up for each object (step S503: Yes), another judgment is made as to whether or not the settings for the solid color retaining function are identical (step S504). In the present embodiment, a judgment is made, for example, as to whether or not the setting for the solid color retaining function of the CMYK-CMYK device link profile for the text object contained in the profile set selected in the process shown in step S502 is identical to the setting for the solid color retaining function of the CMYK-CMYK device link profile for the text object contained in the profile set whose name is accepted in the process shown in step S501. Furthermore, if the solid color retaining function is set to ON, a color conversion process is executed in such a way that a black text object with C 0%, M 0%, Y 0%, and K 100% in CMYK type image data, for example, is retained in a monochromatic K (K 100%) object.

If it is judged that the settings for the solid color retaining function are not identical with each other (step S504: No), the program moves on to the processes of step S510 and thereafter. On the other hand, if it is judged that the settings for the solid color retaining function are identical with each other (step S504: Yes), another judgment is made as to whether or not the settings for the color contamination removal function are identical (step S505). In the present embodiment, a judgment is made, for example, as to whether or not the setting for the color contamination removal function of the CMYK-CMYK device link profile for the text object contained in the profile set selected in the process shown in step S502 is identical to the setting for the color contamination removal function of the CMYK-CMYK device link profile for the text object contained in the profile set whose name is accepted in the process shown in step S501. Furthermore, if the color contamination removal function is set to ON, a color conversion process is executed in such a way that a monochromatic C object with C 70%, M 0%, Y 0%, and K 0% in CMYK type image data, for example, is held as monochromatic C object.

If it is judged that the settings for the color contamination removal function are not identical with each other (step S505: No), the program moves on to the processes of step S510 and thereafter. On the other hand, if it is judged that the settings for the color contamination removal function are identical with each other (step S505: Yes), another judgment is made as to whether or not a comparison for the three kinds of device link profiles has been completed (step S506). In the present embodiment, a judgment is made as to whether or not the comparison of color conversion settings for the three kinds of CMYK-CMYK device link profiles generated for each object has been completed.

If it is judged that the comparison for the three kinds of device link profiles has not been completed (step S506: NO), the processes for step S504 and thereafter are repeated until the comparison of the color conversion settings for the three kinds of CMYK-CMYK device link profiles is completed.

On the other hand, if it is judged that the comparison for the three kinds of device link profiles has been completed (step S506: Yes), the profile set is displayed on the GUI screen (step S507). In the present embodiment, a profile set selected in the process shown in step S502 is displayed on the GUI screen as a candidate of the profile set to be contained in the color configuration.

On the other hand, if it is judged that the color conversion settings of the device link profiles are not set up for each object (step S503: No) in the process shown in step S503, another judgment is made as to whether or not the settings for the solid color retaining function are identical (step S508). If it is judged that the settings for the solid color retaining function are not identical (step S508: No), the program moves on to the processes of step S510 and thereafter. On the other hand, if it is judged that the settings for the solid color retaining function are identical (step S508: Yes), another judgment is made as to whether or not the settings for the color contamination removal function are identical (step S509).

If it is judged that the settings for the color contamination removal function are not identical (step S509: No), the program moves on to the processes of step S510 and thereafter. On the other hand, if it is judged that the settings for the color contamination removal function are identical (step S509: Yes), the profile set is displayed on the GUI screen (step S507).

Next, a judgment is made as to whether or not confirmations are completed for all the profile sets (step S510). If it is judge that confirmations for all the profile sets are not yet completed (step S510: No), the processes of step S502 and thereafter are repeated until confirmation for all the profile sets are completed. On the other hand, if it is judged that confirmations for all the profile sets are completed (step S510: Yes), the process is terminated.

As described in the above, according to the process of the flowchart shown in FIG. 13, profile sets containing the CMYK-CMYK device link profiles having the color conversion setting identical to that of the profile set specified by the user are extracted from a plurality of profile sets, and a list of the profile sets is displayed on the GUI screen. Consequently, by selecting a desired profile sets from the list of the profile sets, the user can easily generate a color configuration consisting of profile sets containing the CMYK-CMYK device link profiles in which an identical color conversion setting is set up for each object or for all the objects.

In the above-mentioned embodiment, a profile set is specified by the user, and profile sets containing device link profiles having color conversion setting identical to that of the device link profile of the specified profile set, are displayed on the GUI screen. However, the method of selecting profile sets containing device link profiles having identical color conversion setting is not limited to the above-mentioned embodiment, but rather it can be done by allowing the user to directly specify a color conversion setting (for example, solid color retaining function: OFF, color contamination removal function: ON), and displaying on the GUI screen a list of profile sets containing device link profiles having the specified color conversion setting.

It is also possible, contrary to the present embodiment, to be constituted in such a way as to have a list of profile sets having a uniform setting for solid color retaining functions for both the CMYK-CMYK device link profile and the RGB-CMYK device link profile displayed on the GUI screen. Moreover, it is also possible to be constituted in such a way as to have a list of profile sets having the identical RGB source profile and CMYK target profile as well as the device link profile having the identical color conversion setting displayed on the GUI screen by combining said first and second profile set display processes, so that the color configuration can be generated from this list.

Next, the operation of the printer controller 2 shown in FIG. 1 will be described below in detail with reference to FIG. 14 and FIG. 15.

Figure 14:
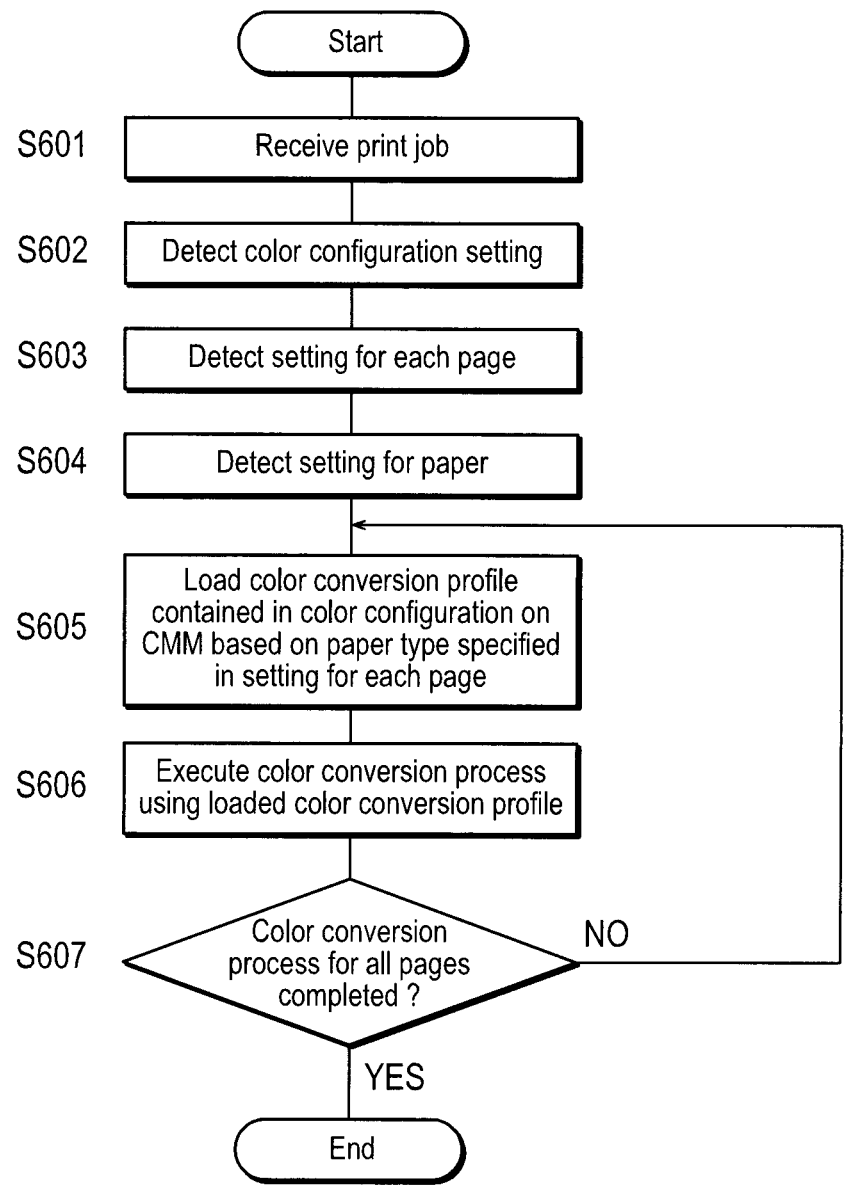
FIG. 14 is a flowchart for describing the image data generation process executed by the printer controller shown in FIG. 1.

FIG. 14 is a flowchart for describing the image data generation process executed by the printer controller shown in FIG. 1. The algorithm shown in the flowchart of FIG. 14 is stored as a program in the storage unit 22 of the printer controller 2 and executed by the control unit 21.

As shown in FIG. 14, in the image data generation process of the present embodiment, a print job is received first (step S601). In the present embodiment, a print job transmitted from the client PC 1 is received.

Next, the color configuration setting is detected (step S602). In the present embodiment, the print data is analyzed and the name of the color configuration specified by the user is detected.

Next, the setting for each page and the setting for paper type are detected (steps S603, S604). In the present embodiment, the print data is analyzed, and the setting information for each page and the setting information for paper type are detected.

FIG. 15 is a diagram showing an example of print data. As shown in FIG. 15, by analyzing the print data, "JAPAN-COLOR" is detected as the name of the color configuration specified by the user. Also, the printing setting specifying the first page to be printed on "coated paper" and second through 10th pages to be printed on "plain paper" is detected.

Next, the color conversion profile contained in the specified color configuration is loaded on the CMM in accordance with paper type specified in setting for each page (step S605). In the present embodiment, the color configuration whose name was obtained in the process shown in step S602 is first called out. Next, the color conversion profile of the profile set contained in the color configuration is loaded on the CMM in accordance with paper type specified for each page detected in the process shown in steps S603 and S604.

The conversion process is executed using the color conversion profile loaded on the CMM (step S606). For example, the color conversion process is executed on the image data of the first page using the color conversion profile contained in the profile set which is associated with coated paper in advance, while the color conversion process is executed on the image data of the second page and thereafter using the color conversion profile contained in the profile set which is associated with plain paper in advance. The image data on which the color conversion process has been executed is sent to the printer 3.

Next, a judgment is made as to whether or not the color conversion process has been completed for all the pages (step S607). If it is judged that the color conversion process has not been completed for all the pages (step S607: NO), the processes of step S605 and thereafter are repeated until the color conversion process for all the pages is completed. On the other hand, if it is judged that the color conversion process is completed for all the pages (step S607: Yes), the process is terminated.

As described in the above, according to the process of the flowchart shown in FIG. 14, the color conversion process appropriate for each page is executed using the color conversion profile contained in the color configuration specified by the user. Consequently, a desirable printing result is obtained in a printing process using various types of paper, as appropriate color conversion process is executed for each page.

Therefore, according to the printing system of the present embodiment, the user can set up desired color conversion profiles easily by specifying a color configuration from a plurality of color configurations registered in the storage unit, even in case of executing a printing process using various types of paper.

Moreover, according to the printing system of the present embodiment, the user can easily generate a color configuration containing the profile sets having common color conversion characteristics as the profile sets are extracted based on the standard specified by the user in generating the color configuration.

The invention is not limited to the embodiment described above, but also can be changed in various ways within the scope of the claims.

For example, a profile set containing nine kinds of color conversion profiles was generated in the embodiment described above. However, the number of color conversion profiles contained in a profile set is not limited to nine kinds, and it can contain only one, the RGB-CMYK device link profile, or only two, e.g., the RGB source profile and the destination profile.

Moreover, the candidate of the profile set to be contained in the color configuration was extracted based on the settings of the solid color retaining function and the color contamination removal function for device link profile in the above embodiment. However, the color conversion setting is not limited to the above embodiment but settings such as paper simulation function for outputting by coloring the paper can be considered.

Furthermore, although a printer controller is shown as the color conversion processing apparatus in the above embodiment, the invention is not limited to it, but rather it can be applied to the MFP (Multi-Function Peripheral).

The units and method of conducting various processes in the printing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a storage unit such as a hard disk. Said program can also be provided as independent application software or can be built into the software of the apparatus of the printing system as a part of its function.

What is claimed is:

1. A non-transitory computer readable recording medium stored with a color conversion setting program, said program causing a computer to execute a color conversion setting process comprising:
   (a) generating a plurality of profile sets respectively associated with paper types, each of the profile sets being used for applying at least one kind of color conversion profile having conversion data for converting colors to a color conversion process depending on a particular paper type used for printing;
   (b) generating color setting information containing said plurality of profile sets respectively associated with paper types to be used during the color conversion process for each print job; and
   (c) executing a control process for registering said color setting information generated in said step (b) to a storage unit, from which said color setting information is read out during the color conversion process for each print job,
   wherein the color conversion setting process further comprises, prior to said step (b):
   (d) accepting a plurality of user's selected profile sets to be contained in said color setting information from the plurality of profile sets generated in said step (a), and
   said color setting information containing the plurality of profile sets accepted in said step (d) is generated in said step (b),
   wherein said color setting information is generated in said step (b) and registered to the storage unit in said step (c) before the user sets each print job,
   wherein a plurality of profile sets are generated for an identical paper type in said step (a), and
   wherein said step (d) includes:

(d1) extracting profile sets having common color conversion characteristics from the plurality of profile sets generated in said step (a); and (d2) accepting the user's selected profile sets to be contained in said color setting information from the profile sets extracted in said step (d1).

2. The non-transitory computer readable recording medium as claimed in claim 1, wherein each one of said plurality of profile sets generated in step (a) contains an RGB profile, which is a color conversion profile to be applied to a color conversion process of RGB type image data, a CMYK profile, which is a color conversion profile to be applied to a color conversion process of CMYK type image data, and a destination profile, which is a color conversion profile to be applied to a color conversion process of image data after the color conversion process where said RGB profile or said CMYK profile is applied, and profile sets containing identical RGB and CMYK profiles are extracted from said plurality of profile sets in said step (d1).

3. The non-transitory computer readable recording medium as claimed in claim 1, wherein each one of said plurality of profile sets generated in step (a) contains a device link profile, which is a color conversion profile to be applied to a direct color conversion process between devices, said device link profile having a color calibration function for calibrating colors, and profile sets containing the device link profile having identical color calibration function are extracted from said plurality of profile sets in said step (d1).

4. The non-transitory computer readable recording medium as claimed in claim 3, wherein said device link profile contains a plurality of per-object device link profiles generated for each type of object that constitutes image data, and profile sets where each of said per-object device link profiles has the identical color calibration function are extracted in said step (d1).

5. A color conversion setting method, comprising:

(a) generating a plurality of profile sets respectively associated with paper types, each of the profile sets being used for applying at least one kind of color conversion profile having conversion data for converting colors to a color conversion process depending on a particular paper type used for printing;

(b) generating color setting information containing said plurality of profile sets respectively associated with paper types to be used during the color conversion process for each print job; and (c) executing a control process for registering said color setting information generated in said step (b) to a storage unit, from which said color setting information is read out during the color conversion process, wherein the color conversion setting method further comprises, prior to said step (b):

(d) accepting a plurality of user's selected profile sets to be contained in said color setting information from the plurality of profile sets generated in said step (a), and said color setting information containing the plurality of profile sets accepted in said step (d) is generated in said step (b), wherein said color setting information is generated in said step (b) and registered to the storage unit in said step (c) before the user sets each print job, wherein a plurality of profile sets are generated for an identical paper type in said step (a), wherein said step (d) includes:

(d1) extracting profile sets having common color conversion characteristics from the plurality of profile sets generated in said step (a); and (d2) accepting the user's selected profile sets to be contained in said color setting information from the profile sets extracted in said step (d1).

6. The color conversion setting method as claimed in claim 5, wherein each one of said plurality of profile sets generated in step (a) contains an RGB profile, which is a color conversion profile to be applied to a color conversion process of RGB type image data, a CMYK profile, which is a color conversion profile to be applied to a color conversion process of CMYK type image data, and a destination profile, which is a color conversion profile to be applied to a color conversion process of image data after the color conversion process where said RGB profile or said CMYK profile is applied, and profile sets containing identical RGB and CMYK profiles are extracted from said plurality of profile sets in said step (d1).

7. The color conversion setting method as claimed in claim 5, wherein each one of said plurality of profile sets generated in step (a) contains a device link profile, which is a color conversion profile to be applied to a direct color conversion process between devices, said device link profile having a color calibration function for calibrating colors, and profile sets containing the device link profile having identical color calibration function are extracted from said plurality of profile sets in said step (d1).

8. The color conversion setting method as claimed in claim 7, wherein said device link profile contains a plurality of per-object device link profiles generated for each type of object that constitutes image data, and profile sets where each of said per-object device link profiles has the identical color calibration function are extracted in said step (d1).

9. A non-transitory computer readable recording medium stored with a color conversion processing program, said program causing a computer to execute a color conversion processing process comprising:

(a) registering to a storage unit plural sets of color setting information, each of which contains a plurality of profile sets, each of the profile sets being respectively associated with a paper type and being used during a color conversion process for each print job;

(b) receiving a print job containing specific information which shows a set of color setting information specified by a user from among said plural sets of color setting information registered in said storage unit;

(c) reading out said set of color setting information specified by said specific information contained in said print job received in said step (b), from said storage unit; and (d) executing the color conversion process on image data of an image which will be printed on a type of paper which the profile set is associated with, using a color conversion profile of a profile set contained in said set of color setting information read out in said step (c), wherein the plurality of profile sets contained in each set of color setting information is selected by a user, and wherein said plural sets of color setting information containing the user selected profile sets are registered to the storage unit, wherein registering to the storage unit of said plural sets of color setting information is performed before receiving the print job, wherein a plurality of profile sets are generated for an identical paper type, and profile sets having common color conversion characteristics are extracted from the plurality of generated profile sets in an extracting step; and wherein the plurality of profile sets contained in each set of color setting information is selected from the extracted profile sets.

10. The non-transitory computer readable recording medium of claim 9, wherein each one of said plurality of generated profile sets contains an RGB profile, which is a color conversion profile to be applied to a color conversion process of RGB type image data, a CMYK profile, which is a color conversion profile to be applied to a color conversion process of CMYK type image data, and a destination profile, which is a color conversion profile to be applied to a color conversion process of image data after the color conversion process where said RGB profile or said CMYK profile is applied, and profile sets containing identical RGB and CMYK profiles are extracted from said plurality of generated profile sets in said extracting step.

11. The non-transitory computer readable recording medium of claim 9, wherein each one of said plurality of generated profile sets contains a device link profile, which is a color conversion profile to be applied to a direct color conversion process between devices, said device link profile having a color calibration function for calibrating colors, and profile sets containing the device link profile having identical color calibration function are extracted from said plurality of generated profile sets in said extracting step.

12. The non-transitory computer readable recording medium of claim 11, wherein said device link profile contains a plurality of per-object device link profiles generated for each type of object that constitutes image data, and profile sets where each of said per-object device link profiles has the identical color calibration function are extracted in said extracting step.

\* \* \* \* \*